Feb. 20, 1951 R. H. HODGSON 2,542,082
VALVE FOR STEP-BY-STEP SERVOMOTORS
Filed Aug. 10, 1949
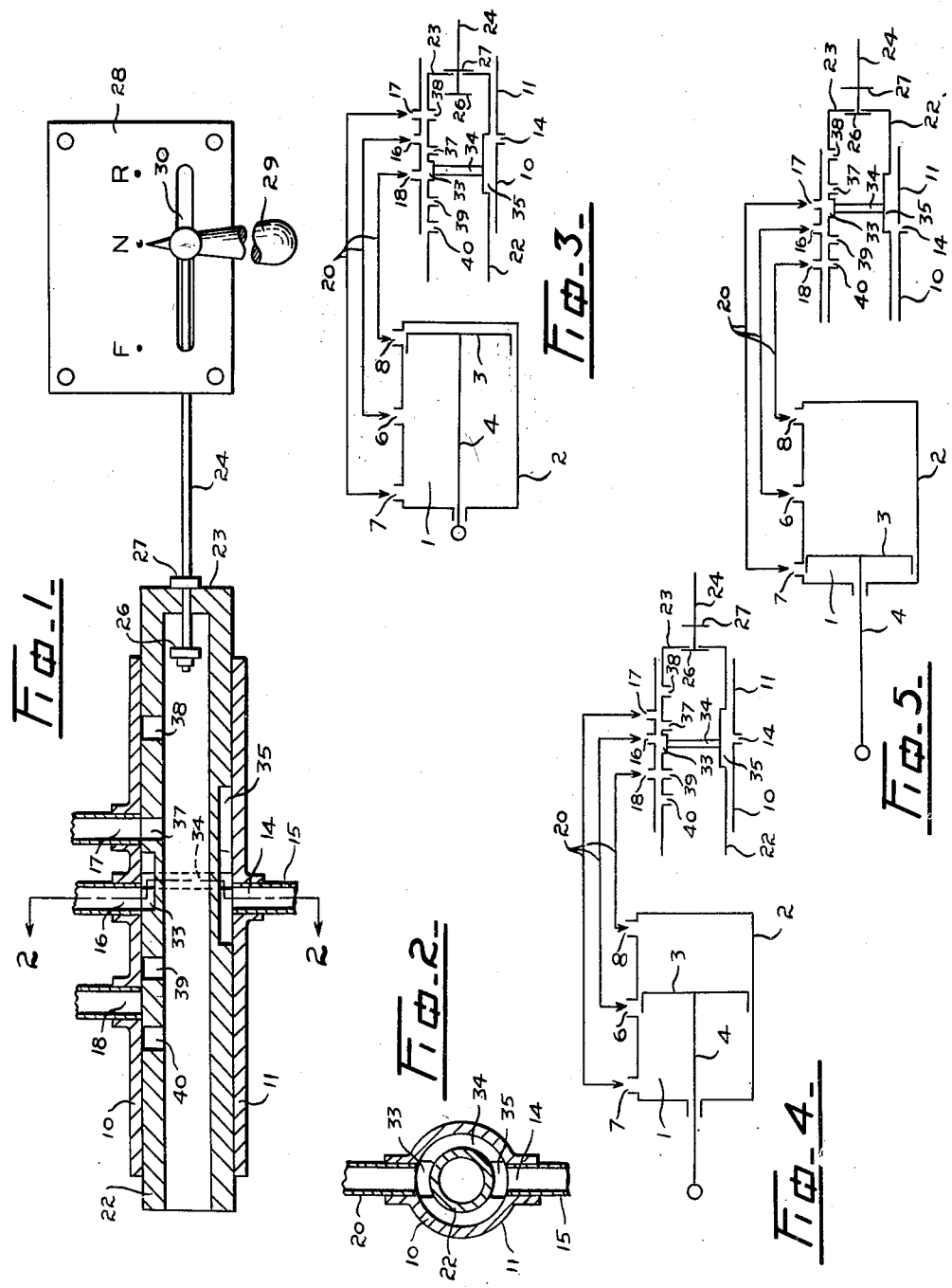
INVENTOR
RICHARD HAROLD HODGSON
Ernest E Carver
ATTORNEY Patented Feb. 20, 1951

2,542,082

UNITED STATES PATENT OFFICE 2,542,082

VALVE FOR STEP-BY-STEP SERVOMOTORS

Richard Harold Hodgson, Vancouver,
British Columbia, Canada

Application August 10, 1949, Serial No. 109,603

6 Claims. (Cl. 121—46.5)

My invention relates to improvements in valves for step-by-step servomotors.

The objects of the invention are to provide a valve mechanism capable of operating a marine transmission from and to any position of neutral, forward or reverse, or operating any other transmission or mechanism in which similar shift movements have to be made.

The device as here shown is designed to carry out the same functions as those described in United States Patent 2,439,515 issued to me April 13th, 1948. A further object is to provide a device for performing the above named functions which relies on the control lever being moved along a straight line path as differentiating from the swing of a lever about a given path.

In the embodiment shown the transmission lever is adapted to be operated by a servomotor operated by suction obtained from the intake manifold of the engine driving the transmission and controlled by a valve mechanism as will be more fully shown and described in the following specification in which:

Figure 1 is a sectional view of the control valve and an elevational view of the operating handle.

Figure 2 is a transverse sectional view taken on line 2—2 of Figure 1.

Figure 3 is a diagrammatic view showing the position of the sleeve valve ports for the servomotor to change the drive to forward from neutral.

Figure 4 is a similar diagrammatic view showing the change to neutral from forward.

Figure 5 is a similar diagrammatic view showing the change to reverse from neutral.

The numeral 1, see Figures 3, 4 and 5, indicates a servomotor having a cylinder 2, a piston 3 and a piston rod 4 which is adapted to be operatively connected to a marine transmission gear, not shown.

The cylinder 2 is provided with three ports 6, 7 and 8 which, when respectively closed off by the piston 3, will have set the transmission to "neutral," "reverse" or "forward" position.

The control valve to actuate the servomotor is generally indicated by the numeral 10 and consists of an open ended stationary cylinder 11 having a main suction port 14 which is adapted to be connected by a pipe 15 to the intake manifold of the engine of the vessel in which the device is installed.

The cylinder 11 is provided also with ports 16, 17 and 18 which are respectively connected by pipes 20 to the neutral, reverse and forward ports 6, 7 and 8 of the servomotor 1. The ports 16, 17 and 18 are unequally spaced from each other, the spacing between ports 16 and 18 being substantially of a ratio of three to two of the spacing between the ports 16 and 17.

Slidably mounted in the cylinder 11 is a valve sleeve 22 having an end closure 23 which is fitted with a push pull rod 24, one end of said rod slidably extending through the end closure 23 and having stops 26 and 27 thereon to provide a predetermined slack between the movement of the valve sleeve 22 and the rod 24.

The outer end of the push pull rod 24 extends behind a dial 28 and is fitted with a hand lever 29 which is slidable in a horizontal slot 30 in said dial to register with dial markings "N" neutral, "F" forward and "R" reverse.

The valve sleeve 22 is held non rotatably within the cylinder 11 by any suitable means and is provided with a port 33 which is capable of registration with any of the ports 16, 17 and 18, and which has not less than twice the longitudinal dimension of any of said cylinder ports, also said port 33 is equal to the length of slack motion provided between the push pull rod 24 and the valve sleeve 22.

The port 33 connects through a periphery groove 34 with a port 35 which is of such length to be in register at all times with the suction port 14.

In alignment with the port 33 are other ports 37 and 38 which are adapted to be brought into register with the port 17 and ports 39 and 40 which are adapted to be brought into register with the port 18.

In use with the control valve 10 in the position shown in Figure 1, suction from the engine manifold will be communicated through the suction port 14 thence through port 16 to the port 6 of the servomotor and the piston 3 will have moved away from port 7 toward port 6 which will substantially close off leaving the transmission in neutral.

If the lever 29 is moved to the left to "F," forward position, the stop 27 will remain in contact with the valve end closure 23 so that the valve sleeve 22 will move exactly the same distance as the push pull rod 24 bringing the ports into the position shown in Figure 3 wherein the suction is exerted through port 8 of the cylinder 2 the said cylinder being relieved through the valve sleeve 22, its port 38, the cylinder port 18 and the servomotor port 7 thus allowing the piston 3 to move to the extreme right, substantially closing off the port 8, all as shown in Figure 3 and leaving the transmission in "forward" gear.

If the next gear change is to be to neutral, the control lever will be moved to the right to "N." The first part of this movement will be in moving the push pull rod 24 alone until its stop 26 engages the end closure 23 of the valve sleeve 22. The subsequent movement of said rod will move the valve sleeve 22 to the position shown in Figure 4 where the servomotor is relieved through the ports 8, 18 and 39 which are then in register and the piston is drawn to neutral position by suction through port 6 to 16 and through passage 34 to suction port 14.

Should it be desired to move the valve sleeve 22 in the same direction to effect a gear change to reverse as in Figure 5 the valve sleeve will move with the rod 24 without lost motion until the several ports assume the position shown in Figure 5 when the piston 3 will be drawn by suction applied to the port 71 of the servomotor.

Assuming now that the last gear change was as in Figure 4 to neutral from forward speed and that it is desired to change back to forward speed, the initial push rod movement to the left is slack motion bringing the stop 27 into contact with the end closure 23 and the subsequent movement will impart an exactly similar movement to the valve sleeve 22, thus bringing the sleeve port 33 into register with port 18 causing air to be exhausted from the right end of cylinder 2 and the piston 3 to move to the right to forward position as the left end of the cylinder is relieved through port 7.

It will be noticed that irrespective of the sequence of moves so long as the lever is moved to any of its indicated positions, forward, neutral or reverse the piston 3 will travel towards and will ultimately substantially close the port of the servomotor corresponding in position to the selected gear of the transmission.

What I claim as my invention is:

1. A valve for controlling the movement of a piston to or from end points and an intermediate point of a control cylinder, said valve comprising an open ended cylinder, a valve sleeve mounted therein, said cylinder having a suction port adapted for connection to a source of suction and three flow-return ports adapted for connection to the end and intermediate points of the control cylinder, said valve sleeve having four ports open to the atmosphere and capable of selective registration with the flow-return ports of the cylinder and a passage provided with one port in continuous register with the suction port and another port adapted to selectively register with the flow-return ports and means for imparting endwise movement to the valve sleeve.

2. A valve for controlling the movement of a piston to or from end points and an intermediate point of a control cylinder, said valve comprising an open ended cylinder, a valve sleeve mounted therein, said cylinder having a suction port adapted for connection to a source of suction and three flow-return ports adapted for connection to the end and intermediate points of the control cylinder, said valve sleeve having four ports open to the atmosphere and capable of selective registration with the flow-return ports of the cylinder and a passage provided with one port in continuous register with the suction port and another port adapted to selectively register with the flow-return ports and means for imparting endwise movement to the valve sleeve, said other port adapted for selective registry with the flow return ports being of twice the length of the flow ports which are open to the atmosphere and means for providing lost motion between the valve sleeve and the means for moving said sleeve.

3. A valve for controlling the movement of a piston towards or from end points and an intermediate point of a control cylinder, said valve comprising an open ended cylinder, a valve sleeve mounted therein, means for imparting endwise movement to the valve sleeve, means for providing lost motion between the valve sleeve and the movement imparting means, said cylinder having a suction port adapted for connection to a source of suction and three flow-return ports adapted for connection to the end and intermediate points of the control cylinder, said valve sleeve having four ports open to the atmosphere and capable of selective registration with the flow-return ports of the cylinder and a passage provided with one port in continuous register with the suction port and another port adapted to selectively register with the flow-return ports.

4. A valve for controlling the movement of a piston towards or from end points and an intermediate point of a control cylinder, said valve comprising an open ended cylinder, a valve sleeve mounted therein, said cylinder having a suction port adapted for connection to a source of suction and three flow-return ports adapted for connection to the end and intermediate points of the control cylinder, said valve sleeve having four ports open to the atmosphere and capable of selective registration with the flow-return ports of the cylinder and a passage provided with one port in continuous register with the suction port and another port adapted to selectively register with the flow-return ports, a push pull rod having sliding engagement with the valve sleeve to provide a lost motion equal to the width of the suction port which is open to the source of suction and to the flow-return ports.

5. A valve for controlling the movement of a piston towards or from end points and an intermediate point of a control cylinder, said valve comprising an open ended cylinder, a valve sleeve mounted therein, said cylinder having a suction port adapted for connection to a source of suction and three flow-return ports adapted for connection to the end and intermediate points of the control cylinder, said valve sleeve having four ports open to the atmosphere and capable of selective registration with the flow-return ports of the cylinder and a passage provided with one port in continuous register with the suction port and another port adapted to selectively register with the flow-return ports, said flow return ports being aligned and spaced apart to define a first, an intermediate and a third port, the centre to centre spacing between the first and intermediate and that of the intermediate to the third port being of different dimension, and means for providing lost motion between the valve sleeve and the means for moving said sleeve.

6. A valve for controlling the movement of a piston towards or from end points and an intermediate point of a control cylinder, said valve comprising an open ended cylinder, a valve sleeve mounted therein, said cylinder having a suction port adapted for connection to a source of suction and three flow-return ports adapted for connection to the end and intermediate points of the control cylinder, said valve sleeve having four ports open to the atmosphere and capable of selective registration with the flow-return ports of the cylinder and a passage provided with one port in continuous register with the suction port and another port adapted to selectively register with the flow-return ports, said flow return ports being aligned and spaced apart to define a first, an intermediate and a third port, the centre to centre spacing between the first and intermediate and that of the intermediate to the third port being in the ratio of two to three and means for providing lost motion between the valve sleeve and the means for moving said sleeve.

RICHARD HAROLD HODGSON.

REFERENCES CITED

The following references are of record in the file of this patent:

FOREIGN PATENTS

| Number | Country | Date |
|---|---|---|
| 794,815 | France | Dec. 26, 1935 |